United States Patent
Li et al.

(10) Patent No.: US 6,898,075 B2
(45) Date of Patent: May 24, 2005

(54) ELECTRONIC INSTRUMENT HOLDING DEVICE

(75) Inventors: Chin-Chen Li, Shinjuang (TW); Mao-Sung Huang, Taoyuan (TW)

(73) Assignee: Darfon Electronics Corp., Taoyuan (TW)

( * ) Notice: Subject to any disclaimer, the term of this patent is extended or adjusted under 35 U.S.C. 154(b) by 51 days.

(21) Appl. No.: 10/114,697

(22) Filed: Apr. 3, 2002

(65) Prior Publication Data

US 2002/0154472 A1 Oct. 24, 2002

(30) Foreign Application Priority Data

Apr. 20, 2001 (TW) .......................................... 90109503 A

(51) Int. Cl.$^7$ ................................................. G06F 1/16
(52) U.S. Cl. .................... 361/683; 361/680; 361/679; 361/685; 312/223.1; 360/97.02; 360/97.01
(58) Field of Search ................................. 361/679, 680, 361/681, 683, 727, 743; 248/455, 121, 135, 694, 900, 918; 400/88, 472, 495, 682; 16/352, 367, 285; D14/345, 392, 394; 312/223.1, 223.2, 208.1, 3, 4; 345/168, 169, 179, 905; 341/21, 22; 235/145 A, 145 R, 146

(56) References Cited

U.S. PATENT DOCUMENTS

| | | | | |
|---|---|---|---|---|
| 5,638,257 A | * | 6/1997 | Kumar et al. | 361/680 |
| 5,708,560 A | * | 1/1998 | Kumar et al. | 361/680 |
| 6,108,200 A | * | 8/2000 | Fullerton | 361/686 |
| 6,496,365 B2 | * | 12/2002 | Tsai | 361/686 |
| 6,538,642 B2 | * | 3/2003 | Tsai | 345/168 |
| 2002/0122028 A1 | * | 3/2001 | Wang | |

* cited by examiner

*Primary Examiner*—Michael Datskovskiy
(74) *Attorney, Agent, or Firm*—Snell & Wilmer L.L.P.

(57) ABSTRACT

Various embodiments of the present invention relate to an electronic instrument holding device and, more particularly, to an electronic instrument holding device having a circuit board. The present invention holds an electronic instrument at a predetermined angle and connects an input device to the electronic instrument so that a user may input information into the electronic instrument with a comfortable viewing angle. A circuit board may also be equipped on the electronic instrument holding device to replace or enhance the board disposed inside the input device so that manufacturing and assembling the input device are accelerated.

16 Claims, 3 Drawing Sheets

ELECTRONIC INSTRUMENT HOLDING DEVICE

CROSS REFERENCE TO RELATED APPLICATIONS

This Application claims priority to Taiwan Application No. 090109503 entitled "Electronic Instrument Holding Device", filed Apr. 20, 2001.

FIELD OF INVENTION

The present invention relates to an electronic instrument holding device and, more particularly, to an electronic instrument holding device having a circuit board.

BACKGROUND OF THE INVENTION

Since the advent of notebook computers, even smaller computers have been developed. Many of these smaller computers have met with only limited success, however, partially because their compact size limits space in which input/output ("I/O") devices may be disposed. Furthermore, many computer users have been disappointed with display quantity and quality in many "sub-notebook" computers. Further, the size of many conventional input devices, such as keyboards used on such computers are too small to allow optimum comfort, speed, and accuracy while inputting data. Many sub-notebook computers therefore often require users to sacrifice both display and I/O convenience. Even though the data processing and the storage capacity of smaller computers is often equivalent to that of a desktop computer, such machines have not yet adequately replaced the user's desktop computer.

One type of smaller-than-notebook computer design that has proven useful and quite popular, however, is the personal digital assistant (PDA) that includes a generally-rectangular chassis with a front surface thereon. The front surface is typically dominated by a LCD display device. In contrast to other computer designs, a PDA does typically not include a traditional "QWERTY" or equivalent keyboard. Instead, a PDA is generally equipped with a few control buttons on the front or side surfaces and a stylus. Users write on the LCD with the stylus to enter data to the PDA. According to the user's preferences, the PDA generally stores the user's writing as a bitmapped form. This bitmapped form often requires substantial memory for storage and, therefore, limits the PDA's ability to manipulate the writing. Alternatively, with the aid of handwriting recognition software stored in the PDA, the PDA can translate the writing into representative codes or characters suitable for more efficient processing and storage.

Alternatively, users can often use the stylus and/or the control buttons on the front and side surfaces to input data by moving a pointer over the LCD to point at a virtual keyboard shown on the screen. This input method, however, is much slower and clumsier than the traditional keyboard.

Due to size limitations, PDAs are generally unable to utilize traditional keyboards. Therefore, a solution of using an external keyboard was proposed. User may separate the external keyboard from the PDA when it is not used, so that only the PDA needs to be carried as the user travels. While inputting data, the user connects the external keyboard to the PDA so that data may be entered quickly and conveniently. Nevertheless, detachable keyboards typically pose a number of problems. Due to the small size of the PDA, the PDA is not typically supported in an upright position on a table or other surface when data is being entered. Moreover, the LCD of the PDA does not typically adjust to a desired view angle, thus resulting in frequent difficulty in viewing the display screen during data entry. Furthermore, to facilitate the need for mobility, it is desirable to make the external keyboard or other input device as small as possible, thus requiring reduced space and/or thickness of the keyboard or other input device. As a result, internal space in the keyboard for circuit boards is often limited. Designing and arranging circuit boards in the keyboard thus becomes more difficult and complicated.

SUMMARY OF THE INVENTION

Exemplary embodiments of the present invention include a holding device that holds a small electronic instrument, such as a PDA and a mobile phone, at a desired angle with respect to a table or other surface. The holding device connects a keyboard or other input device to the electronic instrument so that a user may input information into the electronic instrument at a comfortable viewing angle.

An exemplary electronic instrument holding device of the present invention is suitably positioned on or attached to an input device. The electronic instrument holding device includes a first holding device, a second holding device, and a connecting device. An edge of the first holding device rotatably connects to the input device for supporting an electronic instrument. An edge of the second holding device rotatably connects to the first holding device for supporting the first holding device and adjusting the angle of the first holding device so that a user may properly adjust the view angle. The connecting device of the present invention is movably disposed on the first holding device. When the electronic instrument holding device is folded inside the input device, the connecting device is moved to a specific location to minimize the size. Various embodiments of the present invention further include a lock disposed on an edge of the second holding device. When the electronic instrument holding device is folded inside the input device, the lock and the input device may be locked together to avoid relative motion between the electronic instrument holding device and the input device. In various embodiments, a circuit board, originally disposed inside the keyboard or other input device, may be further minimized and positioned on the first holding device.

DETAILED DESCRIPTION

Figure 1:
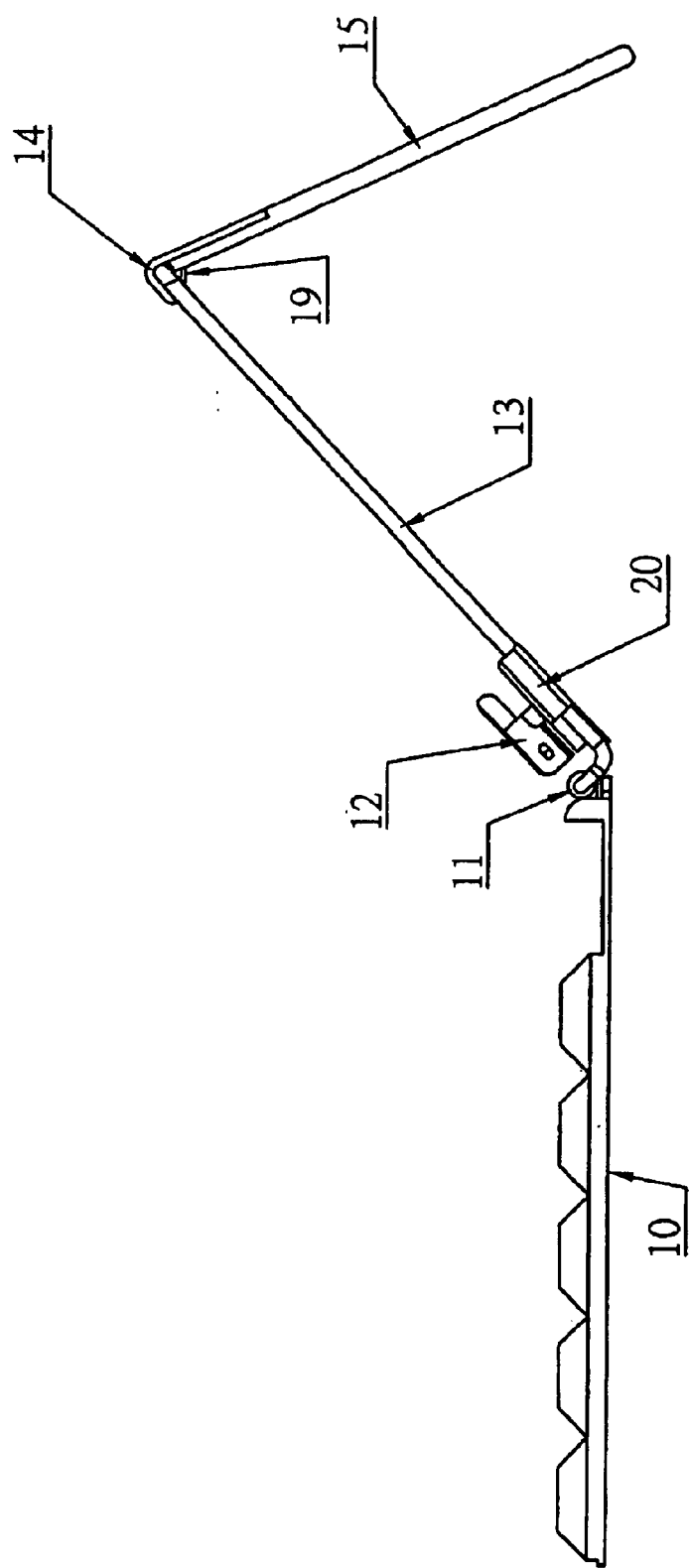
FIG. 1 shows a side view of an unfolded electronic instrument holding device of a first exemplary embodiment of the present invention.

FIG. 1 shows a side view of an electronic instrument holding device of an exemplary first embodiment of the present invention, shown in an unfolded status/state. In the embodiment shown, the first holding device 13 rotatably connects to a side of the input device 10. The connecting device of the input device 10 and the first holding device 13 is a first hinge 11. The first holding device 13 pivots on the first hinge 11 to change an angle between the first holding device 13 and the input device 10. The other side of the first holding device 13 also rotatably connects to the second holding device 15 as appropriate. In an exemplary embodiment, the connecting device of the first holding device 13 and the second holding device 15 is a second hinge 14. The second holding device 15 pivots on the second hinge 14 to change an angle between the first holding device 13 and the second device 15. In addition, a connecting device 12 may be disposed on the first holding device 13. Instead of being mounted above the first holding device 13, however, the connecting device 12 may be movably disposed along a front side of the first holding device 13.

In another embodiment of the present invention, the first holding device 13 is a metal frame. Two ends of the connecting device 12 respectively have a slot 20 that may be used to receive the metal frame of the first holding device 13 to allow the connecting device 12 to slidably move along the metal frame of the first holding device 13. In an embodiment of the present invention, an angle adjustment device 19 is further disposed on the second holding device 15 to adjust the angle between the first holding 13 and the second holding device 15. The angle adjustment device 19 could be a protrusion. The angle adjustment device 19 adjusts the angle between the first holding device 13 and the second holding device 15 by changing the location of the protrusion. Consequently, users may adjust the holder so that the electronic instrument is positioned with a comfortable viewing angle.

Figure 2:
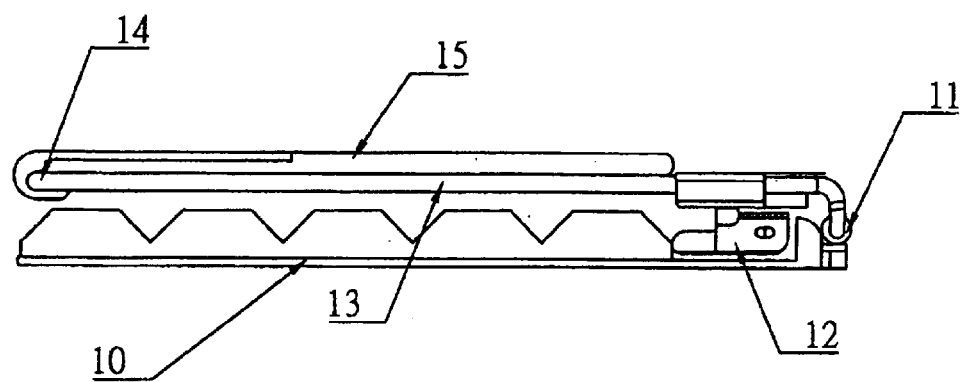
FIG. 2 shows a side view of a folded electronic instrument holding device of an exemplary embodiment of the present invention.

FIG. 2 shows a side view of a folded electronic instrument holding device. In the embodiment shown, the first holding device 13 overlaps with the input device 10 by rotating around the first hinge 11. The first holding device 13 also overlaps with the second holding device 15 by rotating around the second hinge 14. When folding the electronic instrument holding device, to reduce its size, the connecting device 12 is moved along the first holding device 13 to a desired position, such as at the base of first holding device 13.

Figure 3:
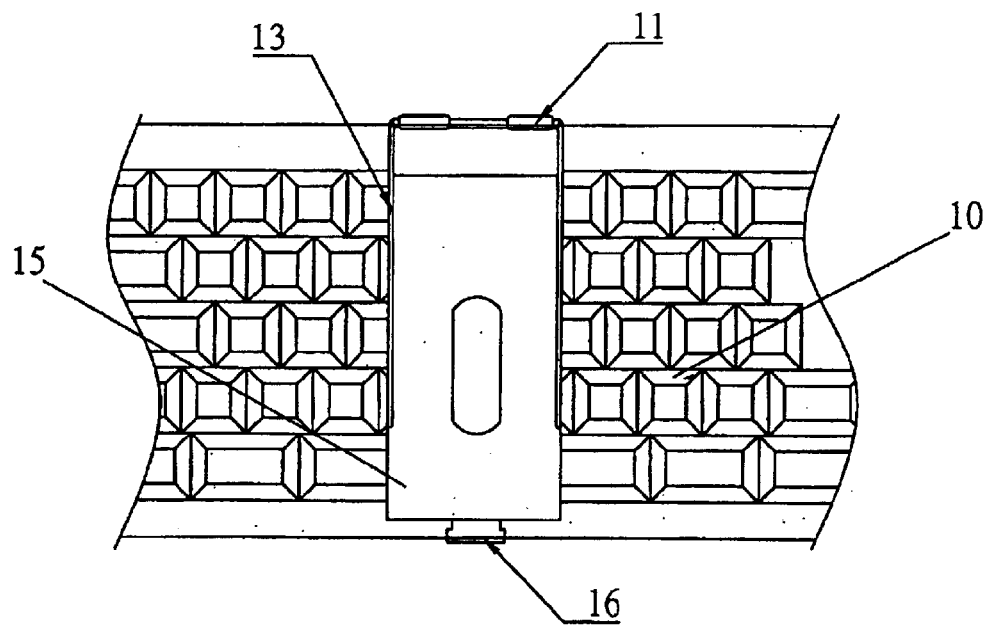
FIG. 3 shows a top view of a folded electronic instrument holding device of an exemplary embodiment of the present invention.

FIG. 3 shows a top view of a folded electronic instrument holding device of an embodiment of the present invention. The embodiment shown further includes a locking member 16 (such as a padlock or locking protrusion) disposed at the edge of the first holding device 13 or the second holding device 15. When the electronic instrument holding device of the present invention is folded inside the input device 10, the locking member 16 and the input device 10 are locked together to avoid relative motion between the electronic instrument holding device and the input device 10.

Figure 4:
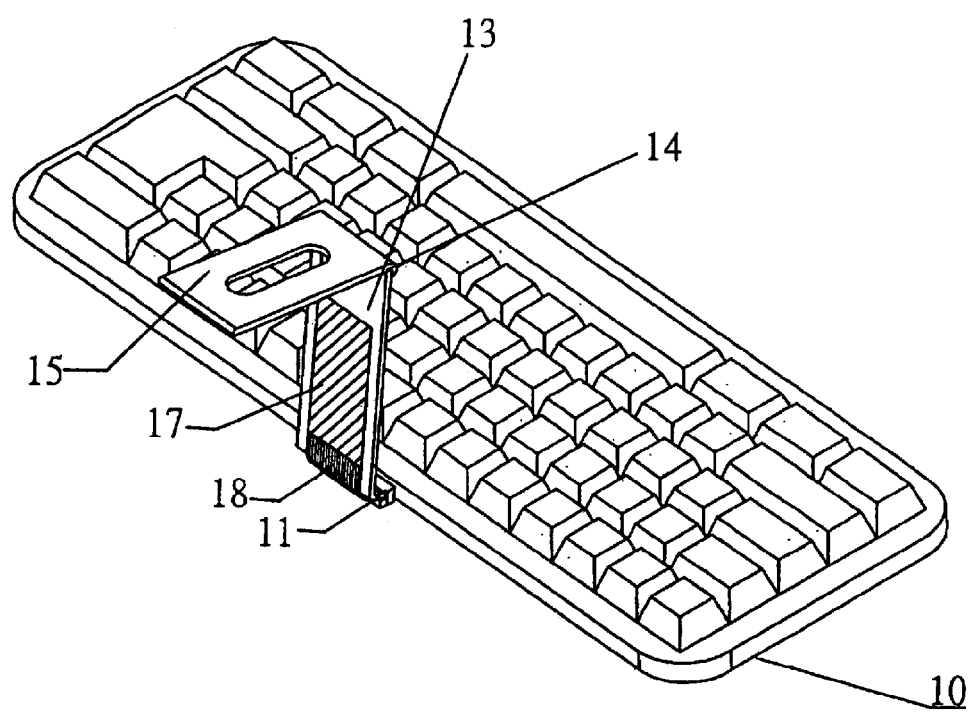
FIG. 4 shows a diagram of an electronic instrument holding device of a second exemplary embodiment of the present invention.

FIG. 4 shows a diagram of an unfolded electronic instrument holding device of another embodiment with a circuit board 17 connected to the holding device. The circuit board 17 of the input device 10 is disposed on the first holding device 13 to fully use the additional space and to further reduce the size of the input device 10. The circuit board 17 may be connected to the input device 10 via a flexible printed circuit board 18 or through any other technique so as to receive and decode signals from the input device 10. The circuit board 17 further connects to the connecting device 12 to output the decoded signals to the electronic instrument connected to the connecting device 12.

Additionally, in another embodiment, the circuit board 17 is disposed on the first holding device 13 to replace, enhance, or supplement the circuit originally disposed inside the keyboard or other input device. In this embodiment the circuit board 17 disposed on the first holding device 13 may be a circuit substrate formed by a rigid printed circuit board (PCB). The circuit board is easily implemented by substrates formed by other materials, however, such as flexible printed circuit boards or membranes. The first holding device 13 disclosed in the embodiment mentioned above could be a sheet board or a metal frame, for example, which is not a limitation of the invention. In such embodiments the second holding device 15 may be a plastic board, or other material. Supporting boards or other supporting devices formed by injection modeling or die casting of any materials suitable for the second holding device 15 could also be used in alternate embodiments. Various input devices of the present invention include keyboards and other input devices such as touch pads, track balls, e-books, electronic tablets and the like. Any palmtops or other small electronic instruments capable of use with external input devices, such as mobile phones, are suitable for the electronic instrument holding device of the present invention.

The electronic instrument holding device of the present invention thusly effectively solves the shortcomings of the prior art. According to various embodiments of the electronic instrument holding device, users may not only adjust the view angle of the electronic instrument, but also combine the input device with the electronic instrument holding device. The invention makes information input much easier while reducing the size requirements of the instrument.

In the foregoing specification the invention has been described with reference to specific embodiments. It will, however, be evident that various modification and changes may be made to thereto without departing from the broader spirit and scope of the invention. The specification and drawings are, accordingly, to be regarded in an illustrative rather than restrictive sense. Thus, it is intended that the present invention covers the modification and variations of this invention provided they come within the scope of the appended claims and their equivalents.

What is claimed is:

1. An electronic instrument holding device disposed on an input device, comprising:

a first holding device having an edge and defining a plane, wherein said edge rotatably connects to a side of said input device;

a connecting device disposed on said first holding device; and a second holding device rotatably connecting to said first holding device;

wherein said first holding device selectively overlaps with said input device, and said second holding device selectively overlaps with said first holding device when said first holding device is unfolded outside said input device, and wherein said plane of said first holding device supports an electronic instrument connected to said connecting device, and said second holding device is unfolded at an angle to support said first holding device.

2. The electronic instrument holding device as set forth in claim 1, wherein said circuit board comprises a circuit substrate formed by a membrane circuit.

3. An input device, comprising:

a body;

a first holding device having a first edge and a second edge and defining a plane, said second edge is opposite to said first edge, wherein said first edge is connected to said body, and said second edge protrudes outside said body; and a circuit board disposed on said first holding device and electronically connecting to said body.

4. The input device as set forth in claim 3, wherein said input device further comprises a flexible printed circuit board coupling said circuit board to said body, wherein said circuit board receives and decodes a signal from said body via said flexible printed circuit board.

5. The input device as set forth in claim 3, wherein said input device further comprises a connecting device disposed on said first holding device and electronically connecting to said circuit board.

6. The input device as set forth in claim 3, wherein said body comprises a hinge connected to said first edge of said first holding device.

7. The input device as set forth in claim 3, wherein said input device further comprises a second holding device having an edge, wherein said edge connects to said second edge of said first holding device.

8. The input device as set forth in claim 7, wherein said edge of said second holding device has a hinge configured to connect to said second edge of said first holding device.

9. The input device as set forth in claim 7, comprising an angle adjustment device disposed on said second holding device configured to adjust an angle between said second holding device and said first holding device.

10. The input device as set forth in claim 9, wherein said angle adjustment device comprises a protrusion.

11. The input device as set forth in claim 3, wherein said circuit board comprises a circuit substrate formed by a flexible printed circuit board.

12. The input device as set forth in claim 3, wherein said circuit board comprises a circuit substrate formed by a membrane circuit.

13. An electronic instrument holding device disposed on an input device, comprising:
- a first holding device having an edge and defining a plane, wherein said edge rotatably connects to a side of said input device;
- a connecting device disposed on said first holding device;
- a second holding device rotatably connecting to said first holding device; and
- a locking member disposed on said second holding device;
- wherein said first holding device selectively overlaps with said input device, and said second holding device selectively overlaps with said first holding device when said first holding device is unfolded outside said input device, and wherein said plane of said first holding device supports an electronic instrument connected to said connecting device, and said second holding device is unfolded at an angle to support said first holding device, and when folding said electronic instrument holding device with said input device, said locking member and said input device are locked to each other to avoid relative motion between said electronic instrument holding device and said input device.

14. An electronic instrument holding device disposed on an input device, comprising:
- a first holding device having an edge and defining a plane, wherein said edge rotatably connects to a side of said input device;
- a connecting device disposed on said first holding device, said connecting device comprising two slots disposed respectively at two opposed edges of said connecting device, said two slots being used to receive said first holding device to allow said connecting device moving along said first holding device; and
- a second holding device rotatably connecting to said first holding device;
- wherein said first holding device selectively overlaps with said input device, and said second holding device selectively overlaps with said first holding device when said first holding device is unfolded outside said input device, and wherein said plane of said first holding device supports an electronic instrument connected to said connecting device, and said second holding device is unfolded at an angle to support said first holding device.

15. An electronic instrument holding device disposed on an input device, comprising:
- a first holding device having an edge and defining a plane, wherein said edge rotatably connects to a side of said input device;
- a connecting device disposed on said first holding device; and
- a second holding device rotatably connecting to said first holding device, wherein said second holding device comprises an angle adjustment device used to adjust an angle between said second holding device and said first holding device;
- wherein said first holding device selectively overlaps with said input device, and said second holding device selectively overlaps with said first holding device when said first holding device is unfolded outside said input device, and wherein said plane of said first holding device supports an electronic instrument connected to said connecting device, and said second holding device is unfolded at an angle to support said first holding device.

16. The electronic instrument holding device as set forth in claim 15, wherein said angle adjustment device comprises a protrusion.

* * * * *

UNITED STATES PATENT AND TRADEMARK OFFICE
CERTIFICATE OF CORRECTION

| | | |
|---|---|---|
| PATENT NO. | : 6,898,075 B2 | Page 1 of 1 |
| APPLICATION NO. | : 10/114697 | |
| DATED | : May 24, 2005 | |
| INVENTOR(S) | : Chin-Chen Li and Mao-Sung Huang | |

It is certified that error appears in the above-identified patent and that said Letters Patent is hereby corrected as shown below:

Col. 4, in claim 1, after Line 3 and before Line 4, insert:

--a circuit board disposed on said first holding device;--

Col. 6, line 52, insert the following New Claim:

--17. The electronic instrument holding device as set forth in claim 1, wherein said circuit board comprises a circuit substrate formed by a flexible printed circuit board.--

Signed and Sealed this

Thirty-first Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 6,898,075 B2  Page 1 of 1
APPLICATION NO. : 10/114697
DATED : May 24, 2005
INVENTOR(S) : Chin-Chen Li and Mao-Sung Huang It is certified that error appears in the above-identified patent and that said Letters Patent is hereby corrected as shown below:

Col. 4, in claim 1, after Line 42 and before Line 43, insert:

--a circuit board disposed on said first holding device;--

Col. 6, line 52, insert the following New Claim:

--17. The electronic instrument holding device as set forth in claim 1, wherein said circuit board comprises a circuit substrate formed by a flexible printed circuit board.--

This certificate supersedes the Certificate of Correction issued March 31, 2009.

Signed and Sealed this

Twenty-first Day of April, 2009

JOHN DOLL
*Acting Director of the United States Patent and Trademark Office*